United States Patent [19]

Stroeters et al.

[11] Patent Number: 5,466,036
[45] Date of Patent: Nov. 14, 1995

[54] VEHICLE WIRE ROUTING APPARATUS

[75] Inventors: Kurt H. Stroeters, Clawson; Dean B. Clark, Pontiac; Glen A. DeGrendel, Sterling Heights, all of Mich.

[73] Assignee: Chrylser Corporation, Highland Park, Mich.

[21] Appl. No.: 239,789

[22] Filed: May 9, 1994

[51] Int. Cl.⁶ .................................................. B60J 5/10
[52] U.S. Cl. ..................... 296/208; 296/146.11; 439/34; 16/362; 49/167; 174/69
[58] Field of Search ................. 296/208, 146.1, 296/152, 146.11; 16/223, 362; 174/69, 68.3, 99 E; 49/167; 439/4, 32, 33, 34, 501

[56] References Cited

U.S. PATENT DOCUMENTS

| | | | |
|---|---|---|---|
| 3,110,754 | 11/1963 | Witort et al. | 174/68.3 X |
| 3,792,189 | 2/1974 | Stengel et al. | 174/DIG. 9 X |
| 3,848,361 | 11/1974 | Foster et al. | 49/167 |
| 3,883,201 | 5/1975 | Busoni | 174/DIG. 9 X |
| 4,276,501 | 6/1981 | Fanz | 318/470 |
| 4,634,159 | 1/1987 | Uchida | 292/336.3 |
| 4,653,799 | 3/1987 | Arai et al. | 296/146 |
| 4,800,648 | 1/1989 | Nakayama et al. | 29/854 |
| 4,869,670 | 9/1989 | Ueda et al. | 439/34 |
| 4,907,836 | 3/1990 | Ueda et al. | 276/39.1 |
| 4,941,258 | 7/1990 | Wright | 29/858 |
| 5,039,829 | 8/1991 | Marks et al. | 49/167 X |
| 5,092,647 | 3/1992 | Ueda et al. | 296/146 |

FOREIGN PATENT DOCUMENTS 489941 1/1953 Canada .................................. 439/31

Primary Examiner—David M. Mitchell
Assistant Examiner—Kia M. Robinson
Attorney, Agent, or Firm—Christopher A. Taravella

[57] ABSTRACT

A wire routing harness apparatus for use between a vehicle body and a liftgate pivotally mounted thereon. The apparatus includes a sheet-like body secured to the vehicle body, covering a portion of a wire from a remote location, and a hollow body secured to the liftgate, slidably mounted on the sheet-like body and adapted to having the wire extended therethrough. The hollow body may include two side-by-side slots formed therethrough for receiving a plurality of wires in each slot. The sheet-like body conforms to the shape of a portion of the vehicle body, and is mounted to be spaced apart therefrom to receive the portion of a wire therebetween.

5 Claims, 2 Drawing Sheets

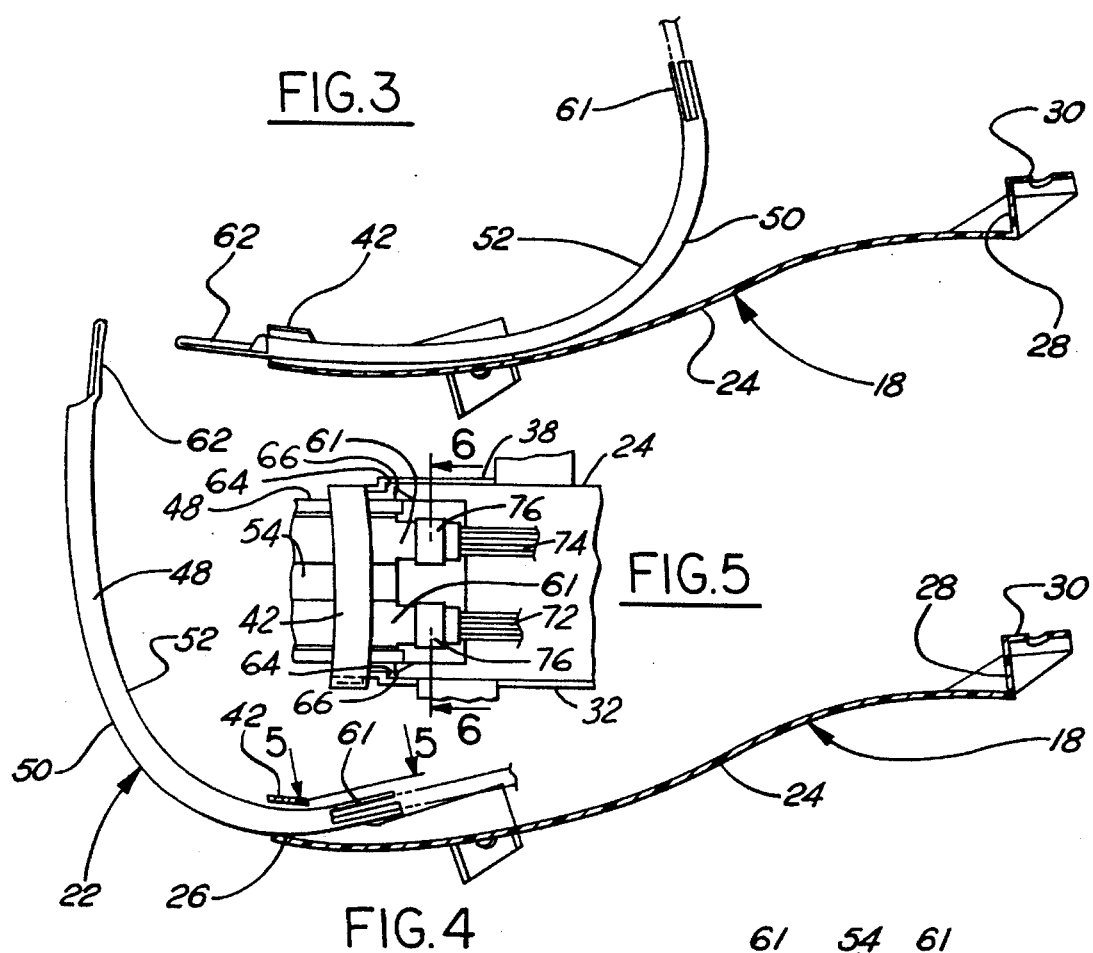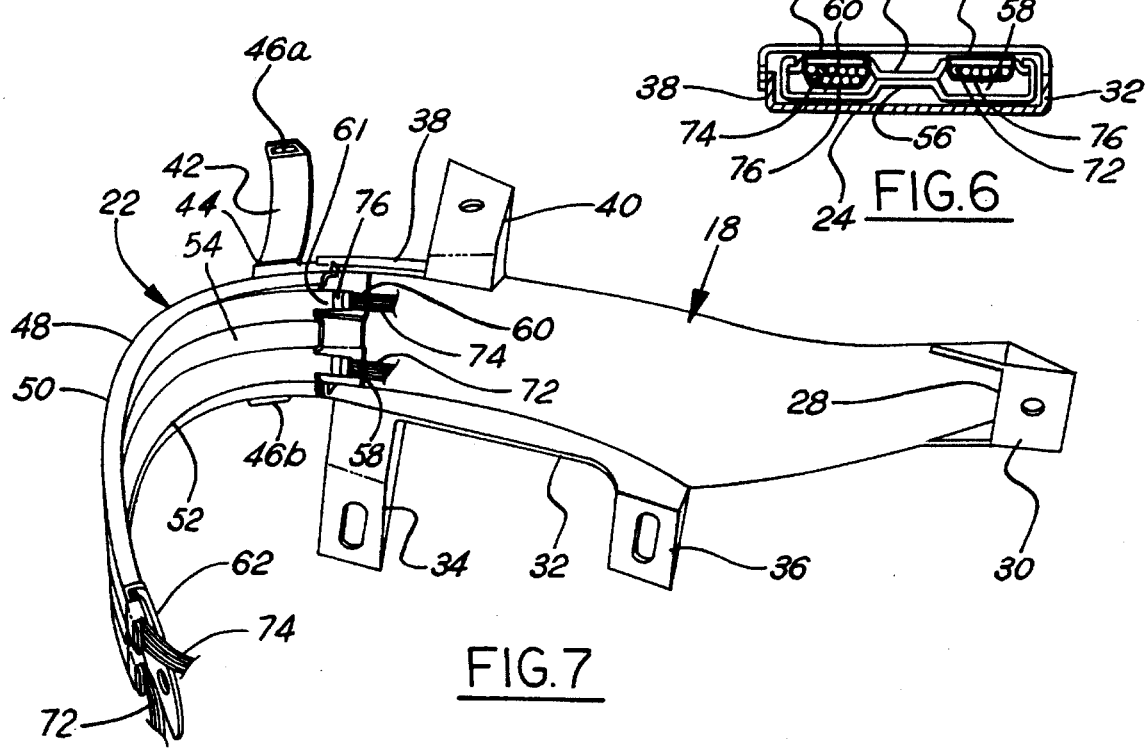

5,466,036

VEHICLE WIRE ROUTING APPARATUS

FIELD OF THE INVENTION

This invention relates generally to wire routing apparatus and, more particularly, to an improvement in wiring routing from the body of the vehicle to its liftgate.

BACKGROUND ART

Heretofore, wiring routing from the body of a vehicle to its liftgate has generally been accomplished with a tube and grommet which routes the wiring out of the vehicle body, through space outside the seal surface, known as the "wet" area, and, thence, into the liftgate. The grommets are on each of the body and liftgate to seal the holes therein.

Ueda et al U.S. Pat. Nos. 5,092,647 and 4,907,836 disclose a wiring harness structure for the hinge mounting end of a vehicle door frame, including a waterproof grommet surrounding the leading-out portion of a wire harness.

Other known vehicle door to body wire routing arrangements are disclosed in Wright U.S. Pat. Nos. 4,941,258; Ueda et al 4,869,670; Nakayama et al 4,800,648; Arai et al 4,653,799; and Uchida 4,634,159.

DISCLOSURE OF THE INVENTION

A general object of the invention is to provide an improved wire routing apparatus.

Another object of the invention is to provide a wire routing apparatus which eliminates a "wet" area, along with the time and difficulty involved in passing the wiring out through and then in through sheet metal holes defining the wet area.

A further object of the invention is to provide a wire routing apparatus which routes the wiring along the surface of the sheet metal instead of through holes in the sheet metal.

A still further object of the invention is to provide a wire routing apparatus which includes two relatively slidably mounted plastic components enclosing the wiring being routed.

Still another object of the invention is to provide a wire routing apparatus including a sheet-like body secured to a vehicle body, covering a portion of groups of wires from a remote location, and a hollow body, which may define two side-by-side slots, secured to a liftgate and being slidably mounted on the sheet-like body and adapted to having the wires extended through each slot.

These and other objects and advantages will become more apparent when reference is made to the following drawings and the accompanying description.

BRIEF DESCRIPTION OF THE DRAWINGS

FIG. 3 is an enlarged side elevational view of the invention, in partial cross-section, in its closed condition;

FIG. 4 is a view similar to FIG. 3 illustrating the invention in its open condition;

FIGS. 5 and 6 are cross-sectional views taken along the planes of the lines 5—5 and 6—6 of FIGS. 4 and 5, respectively, and looking in the directions of the arrows; and FIG. 7 is an enlarged perspective view of the FIG. 4 structure.

BEST MODE OF CARRYING OUT THE INVENTION

Figure 1:
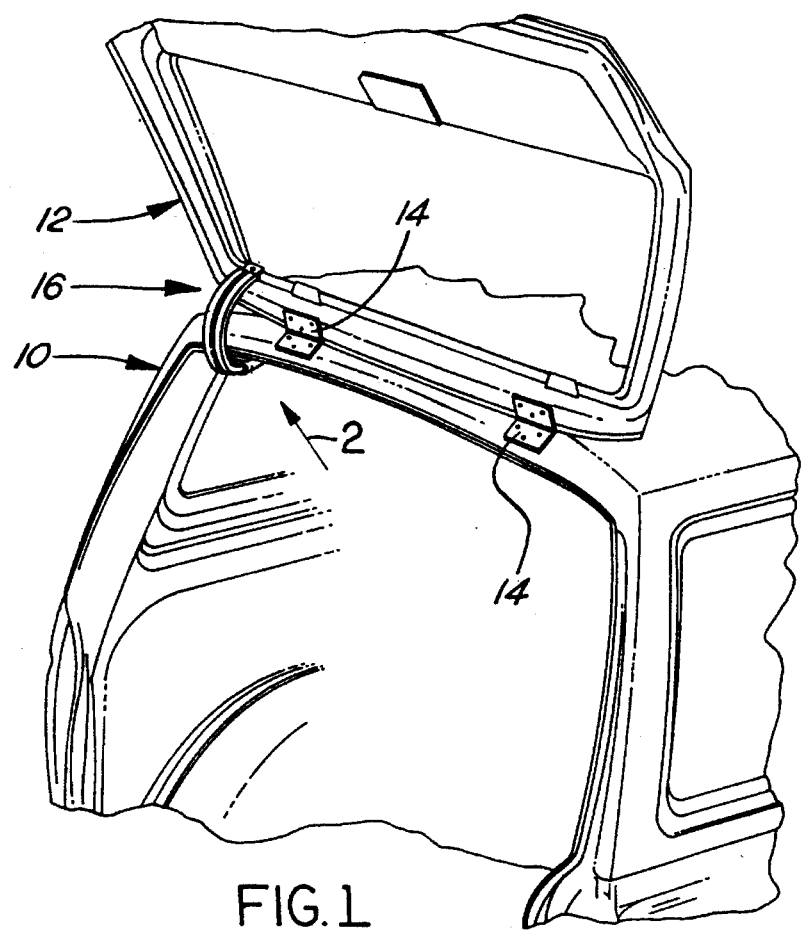
FIG. 1 is a fragmentary perspective view of a vehicle body and liftgate embodying the invention.

FIG. 1 illustrates a vehicle body 10 having a liftgate 12 pivotally mounted thereon by hinges 14, with a wire harness apparatus 16 operatively connected therebetween.

Figure 2:
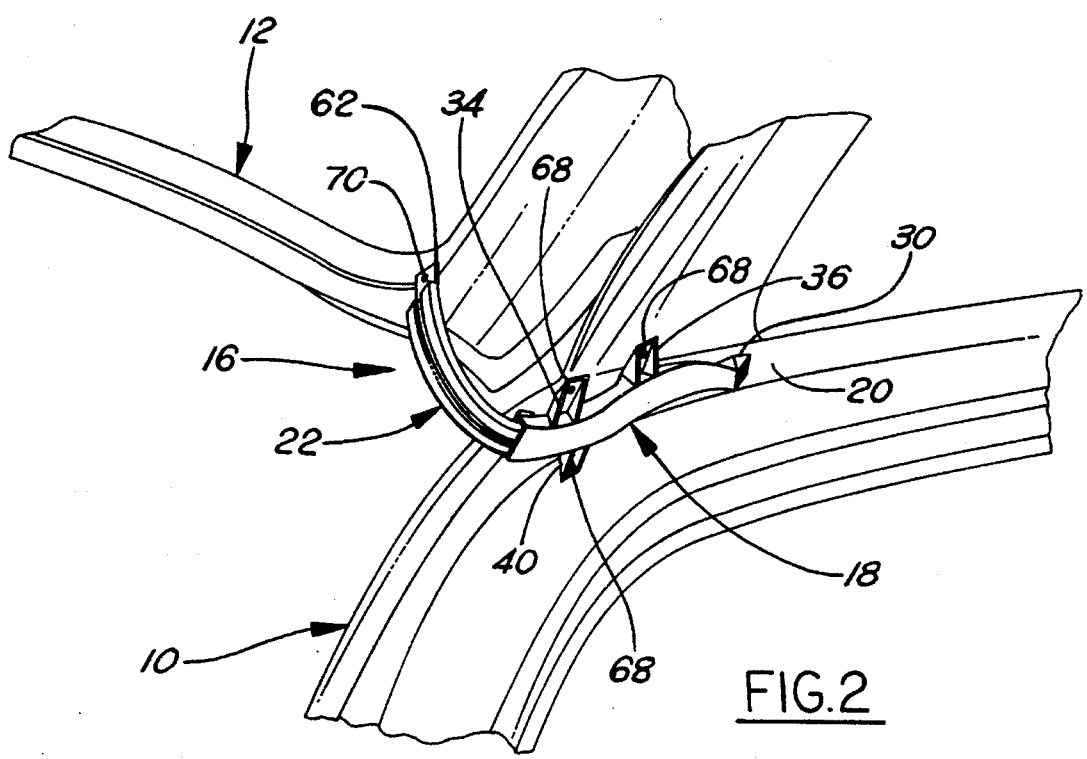
FIG. 2 is an enlarged fragmentary perspective body and liftgate view illustrating the invention at a different angle than in FIG. 1.

As shown in FIG. 2, the wire harness apparatus 16 includes generally a first member 18 secured to an inner surface 20 of the vehicle body 10, and a second member 22 secured to the liftgate 12 and slidably mounted in the first member 18.

More specifically, the first member 18 includes a shallow S-shaped plastic molded body 24, approximately 11 inches long, and having an open end 26 and a stepped end 28 (FIGS. 3 and 4). A perforated mounting flange 30 is formed on the upper edge of the stepped end 28.

A side wall 32 (FIG. 6) is formed on one edge of the body 24 from the open end 26 to approximately the mid point of the body. A pair of perforated mounting flanges 34 and 36 are formed adjacent the oppositely disposed ends of the side wall 32, the flange 34 closer to the open end 26 being longer than the other flange 36.

A short side wall 38 (FIG. 6) is formed on the other edge of the body 24 from the open end 26 for approximately one fourth the length of the body. A further perforated mounting flange 40 is formed at the end of the side wall 38 away from the open end 26.

The body 24 between the side walls 32 and 38 is approximately 2 inches wide for the length of the side wall 32, tapering inwardly, as shown in FIG. 6, from the end of the side wall 32 to the stepped end 28 to approximately a 1 inch width.

A strap 42 (FIG. 7) extends from a flexible hinge 44 on the upper edge of the short side wall 38 adjacent the open end 26, to the upper edge of the longer side wall 32, connectable there by a snap-together latch 46a and 46b formed between the distal end of the strap 42 and the upper edge of the side wall 32.

The second member 22 includes an arcuate-shaped body 48 having outer and inner spaced-apart halves 50 and 52, respectively, interconnected at their outer edges. The body halves 50 and 52 are formed with respective inwardly indented, mating center strips 54 and 56 (FIG. 6), defining a pair of slots 58 and 60.

The outer body half 50 is longer (FIGS. 3, 4 and 7) by, say, approximately ½ inch at one end than the inner body half 52. Two spaced-apart tabs 61 (FIGS. 5 and 7) extend from the edge of the outer body half 50. A mounting flange 62 extends longitudinally from the other end of the inner body half 52.

The arcuate-shaped body 48 is slidably mounted into the body 24 under the strap 42 between the walls 32 and 38, with the mounting flange 62 remaining outside the first member 18. A pair of shoulders 64 are formed at the oppositely disposed ends of the respective walls 32 and 38 adjacent the strap 42. A pair of outwardly extending projections 66 are formed adjacent the end of the arcuate-shaped body 48, serving to snap past and then engage the shoulders 64 to thereafter prevent the assembly from coming apart.

As shown in FIG. 2, the first member 18 is secured to the vehicle body surface 20 via the mounting flanges 30, 34, 36 and 40 by suitable fasteners, represented as 68. The second member 22 is secured to the liftgate 12 via the mounting flange 62 by a suitable fastener 70.

As shown in FIGS. 5–7, two sets of wires 72 and 74 are fed from within the vehicle body 10 onto the body 24 between the side walls 32 and 38, and secured by strips of tape 76 to the respective tabs 61, prior to passing into and through the respective slots 58 and 60, into the liftgate 12.

INDUSTRIAL APPLICABILITY

It should be apparent that the invention provides an improved wire harness apparatus, wherein the wiring is not exposed between the vehicle body and the open liftgate.

It should also be apparent that the respective shapes of the two slidably interconnected components of the invention may be formed differently from those described herein, to accommodate attachment to different vehicle models.

While but one embodiment of the invention has been shown and described, other modifications are possible within the scope of the following claims.

What is claimed is:

1. A wire routing harness apparatus for use between two relatively movable elements, said apparatus comprising a sheet-like body secured to one of said elements, adapted to covering a portion of a wire from a remote location in said one of said elements, and a hollow body secured to the other of said elements and slidably mounted on said sheet-like body and adapted to having said wire extended therethrough, wherein said two relatively movable elements are a vehicle body and a liftgate pivotally mounted thereon, wherein said sheet-like body conforms to the shape of a portion of said vehicle body, and is mounted to be spaced apart therefrom to receive said portion of a wire therebetween.

2. The wire routing harness apparatus described in claim 1, wherein said hollow body is arcuate-shaped, and secured at one end thereof to said liftgate.

3. The wire routing harness apparatus described in claim 1, and mounting flanges formed on the respective sheet-like body and hollow body.

4. The wire routing harness apparatus described in claim 1, and cooperating shoulders and projections formed on said respective sheet-like body and hollow body to prevent the bodies from coming apart once assembled.

5. A wire routing harness apparatus for use between two relatively movable elements, said apparatus comprising a sheet-like body secured to one of said elements, adapted to covering a portion of a wire from a remote location in said one of said elements, and a hollow body secured to the other of said elements and slidably mounted on said sheet-like body and adapted to having said wire extended therethrough, wherein said hollow body has two side-by-side slots formed therethrough each with an entrance for receiving a plurality of wires in each slot, and a tab extending from the entrance to each slot, and a strip of tape securing each of said plurality of wires to each said tab.

* * * * *